United States Patent
Nittel et al.

(10) Patent No.: US 6,479,439 B1
(45) Date of Patent: Nov. 12, 2002

(54) REGENERATOR OF ACID REACTION LUBRICANT RESIDUES

(75) Inventors: Klaus-Dieter Nittel, Frankfurt am Main (DE); Uwe Rau, Kōnigstein (DE); Norbert Schwinke-Kruse, Dreieich (DE)

(73) Assignee: Metallgesellschaft Aktiengesellschaft, Frankfurt am Main (DE)

( * ) Notice: Subject to any disclaimer, the term of this patent is extended or adjusted under 35 U.S.C. 154(b) by 0 days.

(21) Appl. No.: 09/509,696

(22) PCT Filed: Oct. 22, 1998

(86) PCT No.: PCT/EP98/06708

§ 371 (c)(1), (2), (4) Date: Nov. 6, 2000

(87) PCT Pub. No.: WO99/21946

PCT Pub. Date: May 6, 1999

(30) Foreign Application Priority Data

Oct. 29, 1997 (DE) .......................................... 197 47 681

(51) Int. Cl.[7] .............................................. C10G 71/00
(52) U.S. Cl. .................... 508/111; 508/111; 508/164; 508/170; 508/173; 508/178; 554/74; 208/18
(58) Field of Search ................................ 508/111, 164, 508/170, 173, 174; 208/18; 554/74

(56) References Cited

U.S. PATENT DOCUMENTS 5,277,832 A * 1/1994 Gill et al.
5,602,085 A * 2/1997 Peterson et al.

FOREIGN PATENT DOCUMENTS

| DE | 2102295 | 8/1972 |
| EP | 0597803 | 5/1994 |
| EP | 0341802 | 11/1998 |

OTHER PUBLICATIONS

Derwent Publications ltd., London, GB; Class A97, AN 89–219284—Section Ch, Week 8930, & SU 1 434 413 A (Buisk Chem Wks). Nov. 15, 1988.

* cited by examiner

*Primary Examiner*—Sreeni Padmanabhan
*Assistant Examiner*—Farhad Forohar
(74) *Attorney, Agent, or Firm*—Fulbright & Jaworski LLP

(57) ABSTRACT

The invention relates to a method for regenerating reaction lubricant residues containing acid organic lubricants refused and processed during cold forming and multivalent metal ions and phosphate ions, wherein said reaction lubricant residues undergo the following procedural steps: a) precipitating metal ions from the metal organic compounds by adding phosphoric acid and/or acid phosphoric acid esters; b) dissolving water-soluble impurities by adding water; c) separating the solids from the lubricant components and from the aqueous phases that are incompatible with the oily lubricant components, and whereby d) acid phosphoric acid esters for adjusting the free acid at a value of less than 10 points and for adjusting a total acidity point value of less than 70 is adjusted at a free acid. total acidity ratio having a value in the range of 0.15 to 0.5. The separation indicated in step c) preferably occurs by means of a centrifuge at 2,000 to 3,000 g, especially at 8,000 to 15,000 g.

4 Claims, No Drawings

REGENERATOR OF ACID REACTION LUBRICANT RESIDUES

DESCRIPTION

This Application is A 371 of PCT/EP98/06708 Filed on Oct. 22, 1998.

The invention relates to a method for the regeneration of acidic, organic lubricant stripped during the cold forming and processed, as well as reaction lubricant residues containing multivalent metal ions and phosphate ions.

Acidic reaction lubricants have an oily character and are distinguished in that, in addition to an organic lubricant, they contain constituents which are capable of forming a conversion covering on the surface of the workpiece to be transformed U.S. Pat. No. 3,525,651, U.S. Pat. No. 2,739,915, DE-B-21 02 295, EP-A-24 062, EP-A-25 236). The reaction lubricants, which are in practice the most important by far, contain as component which is capable of forming a conversion covering phosphoric acid polyvalent metal ions phosphate. In the treatment of the workpieces to be deformed iron phosphate layers are essentially produced the presence of phosphoric acid, of polyvalent metal phosphates being produced with the use of reaction lubricants containing polyvalent metal phosphates. The reaction lubricants usually applied when dipping generate on the surface of the workpiece a firmly intergrown conversion covering which guarantees that during the deformation a high measure of separation of workpiece and deforming tool takes place, and that on the other hand, a secure binding of the organic lubricant to the workpiece surface is given.

Cold forming happens most frequently with the use of reaction lubricants takes place by means of slide-drawing. In this respect, the excess reaction lubricant is stripped off at the outer drawing matrix.

If the slide-drawing takes place with the use of a drawing mandral, excess reaction lubricant is discharged, in addition, from the pipe interior to the outside. The reaction lubricant residues stripped in this way are collected and usually disposed of as waste. A reuse of the stripped reaction lubricant residues is not possible because a change has taken place, as a result of temperature strain and pressure load, such that its original property of layer formation has been completely lost. In addition, rubbed-off metal parts are produced as a result of the friction forces prevailing during the deforming procedure. These are present in undissolved form, but are also present in dissolved form as organic and is inorganic iron compounds, as a result of reaction with further components of the reaction lubricant. The metallic iron content in the reaction lubricant residue prevents its reuse as a result of scratch formation on the pipes to be drawn. In addition, organic iron compounds thicken the reaction lubricant in such a way that a dipping or circulating process can no longer be carried out economically as a result of high lubricant consumption.

The aforementioned disposal of the residues of reaction lubricants usually takes place by burning. In this respect, however, not only are combustion products produced, which can represent a considerable strain on the environment, but components of the reaction lubricant which are valuable in themselves are destroyed.

The object of the present invention is to provide a method for the regeneration of acid reaction lubricant residues, stripped during the cold forming and processed, which allows the restoration of a functional reaction lubricant with the simultaneous use of a substantial part of the components present in the reaction lubricant residues.

The object has been achieved by developing the method of the above-indicated type in accordance with the invention in such a way that, there is added to the reaction lubricant residues, which have passed through the procedural steps of:

a) precipitating metal ions from organometallic compounds by addition of phosphoric acid and/or acid phosphoric acid esters, b) dissolving water-soluble impurities by the addition of water, and c) separating the lubricant component from solids and from aqueous phases which are incompatible with the oily lubricant component, d) acid phosphoric acid ester to adjust the free acid to a value of at least 10 points and to adjust to a total acidity point number of at least 70, with the adjustment of the ratio of free acid: total acidity being to a value in the range of 0.1 to 0.5.

According to the nature of the stripped reaction lubricant residues, it is advisable to add a filtration in order to remove coarse impurities. For this purpose, heating advantageously takes place before the filtration, in order to reduce the viscosity of the reaction lubricant residues.

After the treatment by the addition of phosphoric acid and/or acid phosphoric acid esters corresponding to procedural step a) and the addition of water corresponding to procedural step b), a multi-phase oily product is obtained, the individual phases of which contain the different impurities partially together with the valuable substance to be recovered.

In the subsequent procedural step c) the separation of the lubricant component from solids and from aqueous phases incompatible with the oily lubricant component takes place with the aid of filters, decanters, separators, but preferably with the aid of centrifuges. In this respect, all solids and all phases incompatible with the oily phase, for example the aqueous or is aqueous-acid phase, and all phases, the density of which lies above that of the organic lubricant originally used, are separated.

According to a preferred development of the invention the separation corresponding to step c) takes place by means of a centrifuge at 2000 to 30000 g. The use of a centrifuge at 8000 to 15000 g is particularly advantageous.

As a result of the separating process, an oily substance is obtained, which contains substantially all organic components of the original reaction lubricant. However, there is a deficiency of the components responsible for the formation of the conversion covering because, as a result of reaction during the drawing procedure, a considerable part of the reactive component of the reaction lubricant has been broken down. To restore the functional reaction lubricant acid phosphoric acid esters are added to the oily lubricant component, obtained after passing through step c), to adjust the free acid to a value of at least 10 points and to adjust the total acidity point number to at least 70. In this respect, it is to be observed that the ratio of free acid: total acidity is adjusted to a value in the range of 0.1 to 0.5. If necessary, it can be advantageous additionally to add phosphoric acid in order to adjust the free acid.

Acid esters of saturated or unsaturated fatty alcohols, preferably with a chain length of 16 to 22 C atoms, are particularly suitable as phosphoric acid esters.

The adjustment of free acid and total acidity takes place according to the following method of determination.

For the titration of the free acid about 1 g of the reaction lubricant is weighed exactly into a 300 ml Erlenmeyer flask. 60 ml xylene is added to dissolve the lubricant. This solution is shaken in a 250 ml shaking funnel a total of four times with a mixture of 10 ml demineralized water and 20 ml ethanol. The separated ethanol/water phases are put into a 300 ml Erlenmeyer flask and about 2 ml of an indicator solution, consisting of 0.1% by weight bromocresol green and 99.9% by weight ethanol, are added.

Thereafter, the titration takes place with 0.1 m alcoholic potassium hydroxide solution until there is change in colour from green to blue. The free acid content is given as consumption (ml) potassium hydroxide solution×5.6 initial weight (g).

For the titration of the total acid content, about 1 g of the reaction lubricant is likewise weighed exactly into a 300 ml Erlenmeyer flask and 100 ml of a solvent mixture, consisting of 0.1% by weight alkali blue (indicator), 42.9% by weight xylene, 28.5% by weight ethanol and 28.5% by weight isopropanol, are added. After complete dissolution of the lubricant the titration takes place with 0.1 m alcoholic potassium hydroxide solution until there is change in colour from blue to red-purple. The calculation of the total acid is given by:

consumption (ml) potassium hydroxide solution×5.6 initial weight (g).

By suitable selection of the acid phosphoric acid ester and/or the fatty acid, the viscosity of the recovered reaction lubricant should lie between 8 and 1000 mm$^2$/sec at 60° C. The preferred range for reaction lubricants to be used in the dipping method lies between 8 and 100 mm$^2$/sec, for circulating products, the preferred range is 50 to 500 mm$^2$/sec.

EXAMPLE

At preparation for the slide-drawing, bright annealed steel pipes were treated with a commercial reaction lubricant which contained 53% by weight mineral oil of viscosity 8 mPa sec (at 40° C.)

20% by weight oleic acid

15% by weight oleyl alcohol

5% by weight oleylamine

5% by weight polyphosphoric acid

2% by weight demineralized water and had a content of free acid of 22 points and had a total acidity of 98 points. The treatment took place by dipping at a bath temperature of 65° C. for a duration of 10 min.

During the slide-drawing, which provided a cross section reduction of 40%, residues of the reaction lubricant were stripped from the outer and from the inner surface of the workpieces, which residues had lost effectiveness as a result of chemical reaction between components of the reaction lubricant and the substrate surface during the dipping treatment, but also as a result of the pressure load and temperature strain during the deforming procedure. The stripped reaction lubricant had a total point number of 57, a free acid point number of 8, was thickened and as such could no longer be used.

The preparation of the processed reaction lubricant for regeneration took place in such a way that first of all it was collected in barrels, heated to 60° C. and thereafter was poured by way of a filter with a pore diameter of 200 μm into a heatable agitator vessel.

Corresponding to procedural step a), 2% by weight of phosphoric acid were added to the residues of the reaction lubricant located in the agitator vessel and the resulting mixture was stirred for 1.5 hours at a temperature of 50 to 65° C. in order to precipitate out the iron from the organometallic compounds. Thereafter, 3% by weight of demineralized water were added, corresponding to procedural step b), followed by further agitation at 50 to 65° C. for the duration of 1.5 hours in order to extract water-soluble impurities. Subsequently, the separation of the solid phase, primarily iron phosphate, and of the aqueous liquid phase took place in a centrifuge which operated at an acceleration of 10000 g. The centrifuge discharge in this way was then homogenized in an agitator container. The product had a total acidity point number of 43 and a free acid point number of 5. After the reaction lubricant residues had passed through the procedural steps a), b) and c), 17% by weight of an acid phosphoric acid ester of oleyl alcohol were added for the final regeneration. In this way, a reaction lubricant regenerated material is obtained which had a total acidity point number of 98 and a free acid point number of 27.

The regenerated material obtained in the manner described above can be used, after adjustment of the water content to 2% by weight, both for supplementing existing reaction lubricant baths and for providing new ones.

What is claimed is:

1. A method for the regeneration of acidic, organic lubricant stripped during a cold forming process from reaction lubricant residues containing polyvalent metal ions and phosphate ions, said method comprising passing said residues through the following steps:

a) adding to said residues a component selected from phosphoric acid, phosphoric acid esters, and both phosphoric acid and phosphoric acid esters, to said residue to precipitate metal cations;

b) adding water to dissolve water-soluble impurities;

c) separating a lubricant component from said solid and aqueous phases, which phases are incompatible with said lubricant component; and d) adding acidic phosphoric acid ester to the remaining lubricant phase to adjust the free acid to a value of at least 10 points and to adjust total acidity point number to at least 70, with the adjustment of the ratio of free acid to total acidity being in the range of 0.1 to 0.5.

2. The method of claim 1, wherein the separation in step c) is accomplished by centrifugation at 2,000 to 30,000 g.

3. The method of claim 2, wherein said centrifugation is conducted from 8,000 to 15,000 g.

4. The method according to claim 1, wherein additional phosphoric acid is added to adjust the free acid.

* * * * *